(12) United States Patent
McGill et al.

(10) Patent No.: US 7,409,367 B2
(45) Date of Patent: Aug. 5, 2008

(54) DERIVATIVE SECURITIES AND SYSTEM FOR TRADING SAME

(75) Inventors: Bradley J. McGill, Birmingham, AL (US); Evan J. Winston, New York, NY (US)

(73) Assignee: Delta Rangers Inc., Birmingham, AL (US)

( * ) Notice: Subject to any disclaimer, the term of this patent is extended or adjusted under 35 U.S.C. 154(b) by 1513 days.

(21) Appl. No.: 09/857,496

(22) PCT Filed: May 4, 2001

(86) PCT No.: PCT/US01/11748

§ 371 (c)(1),
(2), (4) Date: Jun. 5, 2001

(87) PCT Pub. No.: WO02/091272

PCT Pub. Date: Nov. 14, 2002

(65) Prior Publication Data
US 2003/0101125 A1 May 29, 2003

(51) Int. Cl.
*G06Q 40/00* (2006.01)
(52) U.S. Cl. ....................................................... 705/37
(58) Field of Classification Search .............. 705/37–40
See application file for complete search history.

(56) References Cited

U.S. PATENT DOCUMENTS

| | | |
|---|---|---|
| 3,573,747 A | 4/1971 | Adams |
| 4,751,640 A | 6/1988 | Lucas et al. |
| 4,903,201 A | 2/1990 | Wagner |
| 5,077,665 A | 12/1991 | Silverman |
| 5,126,936 A | 6/1992 | Champion et al. |
| 5,136,501 A | 8/1992 | Silverman et al. |
| 5,375,055 A | 12/1994 | Togher et al. ................ 364/408 |
| 5,557,517 A | 9/1996 | Daughtery, III |
| 5,802,499 A | 9/1998 | Sampson et al. ............... 705/35 |
| 5,806,048 A | 9/1998 | Kiron et al. .................... 705/36 |
| 5,819,237 A | 10/1998 | Garman |

(Continued)

FOREIGN PATENT DOCUMENTS

WO    WO 01/08063    7/2000

(Continued)

OTHER PUBLICATIONS

Briys, Eric et al., "Options, Futures and Exotic Derivatives," Chichester, England: John Wiley & Sons Ltd., 1998.

(Continued)

*Primary Examiner*—Hani M. Kazimi
*Assistant Examiner*—Olabode Akintola
(74) *Attorney, Agent, or Firm*—Morgan, Lewis & Bockius LLP

(57) ABSTRACT

A derivative security whose value is determined by whether an underlying instrument will trade above or below a given price at or by a given time. The price of the underlying instrument in the inventive instrument must move a certain amount in a certain direction in a limited amount of time. If it does, that trade yields a fixed amount of money for the acceptor of the contract (510, 545). If it does not, that acceptor loses the premium lie paid for the contract (510, 545).

3 Claims, 11 Drawing Sheets

U.S. PATENT DOCUMENTS

| | | | |
|---|---|---|---|
| 5,845,266 A | 12/1998 | Lupien et al. | |
| 5,884,286 A * | 3/1999 | Daughtery, III | 705/36 R |
| 5,940,810 A | 8/1999 | Traub et al. | |
| 5,950,176 A | 9/1999 | Keiser et al. | 705/37 |
| 5,963,923 A | 10/1999 | Garber | 705/37 |
| 5,970,479 A | 10/1999 | Shepherd | |
| 5,987,435 A | 11/1999 | Weiss et al. | 705/36 |
| 6,016,483 A * | 1/2000 | Rickard et al. | 705/36 R |
| 6,029,146 A | 2/2000 | Hawkins et al. | |
| 6,058,379 A | 5/2000 | Odom et al. | 705/37 |
| 6,061,662 A | 5/2000 | Makivic | 705/36 |
| 6,062,862 A | 5/2000 | Koskinen | |
| 6,064,985 A | 5/2000 | Anderson | 705/36 |
| 6,088,685 A | 7/2000 | Kiron et al. | 705/36 |
| 6,098,051 A | 8/2000 | Lupien et al. | 705/37 |
| 6,134,536 A | 10/2000 | Shepherd | |
| 6,154,732 A | 11/2000 | Tarbox | |
| 6,157,918 A | 12/2000 | Shepherd | |
| 6,173,276 B1 | 1/2001 | Kant et al. | |
| 6,263,321 B1 | 7/2001 | Daughtery, III | |
| 6,304,858 B1 | 10/2001 | Mosler et al. | |
| 6,321,212 B1 | 11/2001 | Lange | |
| 6,381,586 B1 | 4/2002 | Glasserman et al. | |
| 6,418,419 B1 | 7/2002 | Niebor et al. | |
| 6,421,653 B1 | 7/2002 | May | |
| 6,456,982 B1 | 9/2002 | Pilipovic | |
| 6,493,683 B1 | 12/2002 | David et al. | |
| 6,519,574 B1 | 2/2003 | Wilton et al. | |
| 6,546,375 B1 | 4/2003 | Pang et al. | |
| 6,601,044 B1 | 7/2003 | Wallman | |
| 6,618,707 B1 * | 9/2003 | Gary | 705/36 R |
| 6,622,130 B1 | 9/2003 | Shepherd | |
| 6,691,094 B1 | 2/2004 | Herschkorn | |
| 6,772,136 B2 | 8/2004 | Kant et al. | |
| 6,829,589 B1 | 12/2004 | Saliba | |
| 2001/0032169 A1 | 10/2001 | Sireau | |
| 2001/0049651 A1 | 12/2001 | Selleck | |
| 2001/0056392 A1 | 12/2001 | Daughtery, III | |
| 2002/0069155 A1 | 6/2002 | Nafeh | |
| 2002/0099640 A1 * | 7/2002 | Lange | 705/37 |
| 2002/0099651 A1 | 7/2002 | May | |
| 2002/0107784 A1 | 8/2002 | Hancock et al. | |
| 2002/0123954 A1 | 9/2002 | Hito | |
| 2002/0128955 A1 | 9/2002 | Brady et al. | |
| 2002/0138390 A1 | 9/2002 | May | |
| 2002/0147670 A1 | 10/2002 | Lange | |
| 2002/0161693 A1 | 10/2002 | Greenwald | |
| 2002/0174055 A1 | 11/2002 | Dick et al. | |
| 2002/0194105 A1 | 12/2002 | Klein | |
| 2002/0194115 A1 | 12/2002 | Nordlicht et al. | |
| 2003/0014354 A1 | 1/2003 | Madoff et al. | |
| 2003/0023539 A1 | 1/2003 | Wilce et al. | |
| 2003/0023546 A1 | 1/2003 | Shepherd | |
| 2003/0028476 A1 | 2/2003 | Jenkins et al. | |
| 2003/0033240 A1 | 2/2003 | Balson et al. | |
| 2003/0061148 A1 | 3/2003 | Alavian | |
| 2003/0093356 A1 | 5/2003 | Kaufman | |
| 2003/0093360 A1 | 5/2003 | May | |
| 2003/0097328 A1 | 5/2003 | Lundberg | |
| 2003/0110107 A1 | 6/2003 | Hiatt et al. | |
| 2003/0115128 A1 | 6/2003 | Lange et al. | |
| 2003/0135446 A1 | 7/2003 | Birle et al. | |
| 2003/0149652 A1 | 8/2003 | Pham | |
| 2003/0154153 A1 | 8/2003 | Steidlmayer et al. | |
| 2003/0208430 A1 | 11/2003 | Gershon | |
| 2003/0225657 A1 | 12/2003 | Whaley et al. | |
| 2003/0229571 A1 | 12/2003 | May | |
| 2003/0236738 A1 | 12/2003 | Lange et al. | |
| 2004/0034587 A1 | 2/2004 | Anderson et al. | |
| 2004/0039670 A1 | 2/2004 | Fung | |
| 2004/0059656 A1 | 3/2004 | Good et al. | |
| 2004/0068459 A1 | 4/2004 | Goulet et al. | |
| 2004/0111358 A1 | 6/2004 | Lange et al. | |
| 2004/0117291 A1 | 6/2004 | O'Callahan | |
| 2004/0139031 A1 | 7/2004 | Amaitis et al. | |
| 2004/0162776 A1 | 8/2004 | Vrabel | |
| 2004/0199450 A1 | 10/2004 | Johnson et al. | |
| 2004/0199452 A1 | 10/2004 | Johnson et al. | |
| 2004/0199459 A1 | 10/2004 | Johnson et al. | |
| 2004/0210504 A1 | 10/2004 | Rutman | |
| 2004/0210507 A1 | 10/2004 | Asher et al. | |
| 2004/0210511 A1 | 10/2004 | Waelbroeck et al. | |

FOREIGN PATENT DOCUMENTS

| | | |
|---|---|---|
| WO | WO 01/08063 | 2/2001 |

OTHER PUBLICATIONS

Taleb, Nassim, "Dynamic Hedging: Managing Vanilla and Exotic Options," New York, New York: John Wiley & Sons, Inc., 1997.
http://www.biz.uiowa.edu/iem/markets/fedpolicyb.html.
"Alternate Trading Systems: The New Regulatory Framework", Sara Hewitt and Gerard R. Boyce, <http://www.brownraysman.com/publications/corpupd/corpop0199.html>.
"The SEC's Assault On Electronic Trading", Dale A. Oesterle, Regulation, vol. 21, No. 3, 1998, pp. 17-23.
"Trends in Trading", Bill Irving and Tony Evangelista, Perspectives/Trading, 2000, pp. 4-9.
"About Nasdaq InterMarket", <http://www.intermarket.nasdaqtrader.com/about.stm...>.
"Blackbird: Intelligence", <http://www.blackbird.net/sub/10_14_2k.html>.
"Bond Connect—Where liquidity meets", <wysiwyg://216/http://www.bondconnect.com/aboutus/index.html>.
"Business Wire:", <http://www.findarticles.com/cr_0/m0EIN/2000_Nov_17/67044212/print.jhtml>.
"Derivatives Strategy—Apr. 2000: Alternative Trading Systems Fight for Turf", <http://www.derivativesstrategy.com...ne/archive/2000/0400feal.asp?print...>.
"Derivatives Strategy—Apr. 2000: Who's Doing What?", <http://www.derivativesstrategy.com...ne/archive/2000/0400fea6.asp?print...>.
"Eprocessing", <http://www.sungard.com/about_eprocess.cfm...>.
"Fenics—Welcome to Fencis.com", <http://www.fenics.com/index.cfm...>.
"SunGard Integration Pays Off", (related website) <http://www.risk.net/supplements/technology/technologyrisk00-news.html>.
"Hedge Funds, RCGPSD: on-line traditional portfolio management, online trading", <http://www.rcgpsd.com/mds/hedgefundsac.asp>.
"Investment Dealers' Digest:", <http://www.findarticles.com/cf_0/m...1999_august_9/55378118/print.jhtml>.
"Liquidnet—The Company", <http://www.liquidnet.com/company.html>.
"PANALYTIX: Advanced Term Structure Analytics", <http://www.panalytix.com/home.html>.
"PANALYTIX: ApeX Deal Manager-Def . . . ging of Swaps and Swap Derivatives", (related website) <http://www.panalytix.com/trading.html>.
"PANALYTIX: Recent News:", (related website) <http://www.panalytix.com/news.html>.
"PR Newswire", <http://www.findarticles.com/cf_0/m4PRN/2000_Dec_5/67580887/print.jhtml>.
"PR Newswire", <http://www.findarticles.com/cf_0/m4PRN/2000_Dec_13/67929080/print.jhtml>.
"TheStreet.com: Electronic Trading . . . Wait Patiently for Exchange Status", wysiwyg://342/http://www.thestreet.com/stocks/trading/985140.html>.
"TradeWeb", <http://www.tradeweb.com/...>.
"Welcome to NYFix", <http:www.nyfix.com/frameset/welcome.html>.
"NYFix, Inc. Reports Record Third Quarter Results Revenues Rise 115+%Earnings Rise 350+% Listed Order Flow Exceeding 400 Million Shares", (related website) <http://www/trinitech/com/press_releases/10-26-00.html>.

"Finance Home-Yahoo!-Help", (related website) <http://biz.yahoo.com/bw/010109/ct_nyfix.html>.

"Business Wire: NYFIX Millennium, LLC Announces Broker/Dealer Approval; ATS Plans on Target", (related website) <http://www.findarticles.com/m0EIN/2000_July_12/63326078/pl/article.jhtml>.

"Why Use AZX", <http://www.azx.com/azxwhy.shtml>.

"Yahoo-WAMEX Holdings and IB Channel.com Partner to Launch New Round the Clock Global Trading Platform; eSpeed, Inc. and Charles Schwab & Co., Inc. Sign Deal to Give Retail Investors Broader Access to Electronic Trading of U.S. Treasury and U.S. Agency Securities", <http://biz.yahoo.com/pz/000512/7673.html>.

"WAMEX Holdings, Inc.—About WHI", (related website) <wysiwyg://356/http://www.wamx.com/about/index.shtml>.

CBOE Announces Increased Call Strike Flexibility in Equity Flex® Options <http://www.cboe.com/exchange/news/20000210.html>.

"LEPOs-Low Exercise Price Options", Derivatives Division 1800 028 585.

* cited by examiner

CSCO

| | CURRENT PRICE: $56.15 | TODAY'S OPEN: $56.15 | YESTERDAY'S CLOSE: $49.85 |

PUTS

| EXPIRY | Δ CHANGE | PREMIUM | QUANTITY AVAILABLE |
|---|---|---|---|
| CLOSE 10-16-2000 | $1.25 | $47.00 | 250 |
| CLOSE 10-16-2000 | $2.25 | $33.00 | 375 |
| CLOSE 10-16-2000 | $3.00 | $26.00 | 4000 |
| OPEN 10-17-2000 | $1.00 | $50.00 | 10 |
| OPEN 10-17-2000 | $1.50 | $42.00 | 5 |
| OPEN 10-17-2000 | $2.00 | $38.00 | 760 |
| OPEN 10-17-2000 | $4.00 | $15.00 | 600 |
| NOON 10-17-2000 | $1.00 | $55.00 | 72 |
| NOON 10-17-2000 | $2.00 | $42.00 | 2500 |
| NOON 10-17-2000 | $3.00 | $33.00 | 600 |
| CLOSE 10-17-2000 | $4.00 | $15.00 | 23 |
| OPEN 10-18-2000 | $1.00 | $6.00 | 110 |

CALLS

| EXPIRY | Δ CHANGE | PREMIUM | QUANTITY AVAILABLE |
|---|---|---|---|
| CLOSE 10-16-2000 | $1.00 | $5.00 | 4 |
| CLOSE 10-16-2000 | $1.75 | $35.00 | 25966 |
| CLOSE 10-16-2000 | $2.25 | $33.00 | 76 |
| OPEN 10-17-2000 | $1.00 | $55.00 | 1400 |
| OPEN 10-17-2000 | $1.50 | $45.00 | 26 |
| OPEN 10-17-2000 | $3.00 | $26.00 | 2 |
| OPEN 10-17-2000 | $4.00 | $15.00 | 7000 |

[WRITE DELTA CONTRACTS]  [BUY DELTA CONTRACTS]

FIG. 3

WRITE CONTRACT FOR CSCO

| | | | |
|---|---|---|---|
| CONTRACT TYPE: | PUT / CALL (410) | $ CHANGE: | (430) $0.25, $0.50, $0.75, $1.00, $1.25, $1.50, $1.75, $2.00, $2.25, $2.50, $2.75, $3.00, $3.25, $3.50, $3.75, $4.00 |
| EXPIRY: | (420) CLOSE 10-16-2000, OPEN 10-17-2000, NOON 10-17-2000, CLOSE 10-17-2000, OPEN 10-18-2000, NOON 10-18-2000, CLOSE 10-18-2000 | | |
| PREMIUM/CONTRACT: | 42.00 (440) | | |
| #CONTRACTS OFFERED: | 10 (450) | | |

| TYPE | EXPIRY | $ CHANGE | PREMIUM | QUANTITY |
|---|---|---|---|---|
| PUT | OPEN 10-18-2000 | $1.00 | $42.00 | 10 |

CONFIRM (490)   CANCEL

| CSCO | | | |
|---|---|---|---|
| 10-16-2000 | CURRENT PRICE: $56.20 | TODAY'S OPEN: $56.15 | YESTERDAY'S CLOSE: $49.85 |

| EXPIRY | Δ CHANGE | PREMIUM | QUANTITY AVAILABLE |
|---|---|---|---|
| CLOSE 10-16-2000 | $1.25 | $47.00 | 250 |
| CLOSE 10-16-2000 | $2.25 | $33.00 | 375 |
| CLOSE 10-16-2000 | $3.00 | $26.00 | 4000 |
| OPEN 10-17-2000 | $1.00 | $50.00 | 10 |
| OPEN 10-17-2000 | $1.50 | $42.00 | 5 |
| OPEN 10-17-2000 | $2.00 | $38.00 | 760 |
| OPEN 10-17-2000 | $4.00 | $15.00 | 600 |
| OPEN 10-17-2000 | $1.00 | $55.00 | 72 |
| NOON 10-17-2000 | $2.00 | $42.00 | 2500 |
| NOON 10-17-2000 | $3.00 | $33.00 | 600 |
| CLOSE 10-17-2000 | $4.00 | $15.00 | 23 |
| OPEN 10-18-2000 | $1.00 | $42.00 | 10 |
| OPEN 10-18-2000 | $1.00 | $6.00 | 110 |

PUTS — 510

| EXPIRY | Δ CHANGE | PREMIUM | QUANTITY AVAILABLE |
|---|---|---|---|
| CLOSE 10-16-2000 | $1.00 | $5.00 | 4 |
| CLOSE 10-16-2000 | $1.75 | $35.00 | 25966 |
| CLOSE 10-16-2000 | $2.25 | $33.00 | 76 |
| OPEN 10-17-2000 | $1.00 | $55.00 | 1400 |
| OPEN 10-17-2000 | $1.50 | $45.00 | 26 |
| OPEN 10-17-2000 | $3.00 | $26.00 | 2 |
| OPEN 10-17-2000 | $4.00 | $15.00 | 7000 |

CALLS — 545

[WRITE DELTA CONTRACTS]  [BUY DELTA CONTRACTS]

FIG. 6

BUY CONTRACT FOR CSCO

| CONTRACT TYPE | EXPIRY | CHANGE | PREMIUM | # OF CONTRACTS OFFERED |
|---|---|---|---|---|
| CALL | CLOSE 10-16-2000 | $2.25 | 33.00 | 76 |

← 545

USER ENTERS # OF CONTRACTS THEY WISH TO BUY →

| BUY # OF CONTRACTS | TOTAL COST FOR BUYER | POTENTIAL RETURN FOR BUYER |
|---|---|---|
| 10 | $330 | $1,000.00 |

← 620  ← 625  ← 630

[BUY THIS CONTRACT] ← 635

FIG. 7

CSCO

| 10-16-2000 | CURRENT PRICE: $56.25 | TODAY'S OPEN: $56.15 | YESTERDAY'S CLOSE: $49.85 |

PUTS

| EXPIRY | ΔCHANGE | PREMIUM | QUANTITY AVAILABLE |
|---|---|---|---|
| CLOSE 10-16-2000 | $1.25 | $47.00 | 250 |
| CLOSE 10-16-2000 | $2.25 | $33.00 | 375 |
| CLOSE 10-16-2000 | $3.00 | $26.00 | 4000 |
| OPEN 10-17-2000 | $1.00 | $50.00 | 10 |
| OPEN 10-17-2000 | $1.50 | $42.00 | 5 |
| OPEN 10-17-2000 | $2.00 | $38.00 | 760 |
| OPEN 10-17-2000 | $4.00 | $15.00 | 600 |
| NOON 10-17-2000 | $1.00 | $55.00 | 72 |
| NOON 10-17-2000 | $2.00 | $42.00 | 2500 |
| NOON 10-17-2000 | $3.00 | $33.00 | 600 |
| CLOSE 10-17-2000 | $4.00 | $15.00 | 23 |
| OPEN 10-18-2000 | $1.00 | $42.00 | 10 |
| OPEN 10-18-2000 | $1.00 | $6.00 | 110 |

CALLS — 710

| EXPIRY | ΔCHANGE | PREMIUM | QUANTITY AVAILABLE |
|---|---|---|---|
| CLOSE 10-16-2000 | $1.00 | $5.00 | 4 |
| CLOSE 10-16-2000 | $1.75 | $35.00 | 25966 |
| CLOSE 10-16-2000 | $2.25 | $33.00 | 66 |
| OPEN 10-17-2000 | $1.00 | $55.00 | 1400 |
| OPEN 10-17-2000 | $1.50 | $45.00 | 26 |
| OPEN 10-17-2000 | $3.00 | $26.00 | 2 |
| OPEN 10-17-2000 | $4.00 | $15.00 | 7000 |

[WRITE DELTA CONTRACTS] [BUY DELTA CONTRACTS]

| CSCO | | | |
|---|---|---|---|
| 10-16-2000 | CURRENT PRICE: $56.20 | TODAY'S OPEN: $56.15 | YESTERDAY'S CLOSE: $49.85 |

PUTS

| EXPIRY | Δ CHANGE | PREMIUM | QUANTITY AVAILABLE |
|---|---|---|---|
| CLOSE 10-16-2000 | $1.25 | $47.00 | 250 |
| CLOSE 10-16-2000 | $2.25 | $33.00 | 375 |
| CLOSE 10-16-2000 | $3.00 | $26.00 | 4000 |
| OPEN 10-17-2000 | $1.50 | $42.00 | 5 |
| OPEN 10-17-2000 | $2.00 | $38.00 | 760 |
| NOON 10-17-2000 | $1.00 | $55.00 | 72 |
| NOON 10-17-2000 | $3.00 | $33.00 | 600 |
| CLOSE 10-17-2000 | $4.00 | $15.00 | 23 |
| OPEN 10-18-2000 | $1.00 | $6.00 | 110 |

810

CALLS

| EXPIRY | Δ CHANGE | PREMIUM | QUANTITY AVAILABLE |
|---|---|---|---|
| CLOSE 10-16-2000 | $1.00 | $5.00 | 4 |
| CLOSE 10-16-2000 | $1.75 | $35.00 | 25966 |
| CLOSE 10-16-2000 | $2.25 | $33.00 | 76 |
| OPEN 10-17-2000 | $1.00 | $55.00 | 1400 |
| OPEN 10-17-2000 | $1.50 | $45.00 | 26 |
| OPEN 10-17-2000 | $3.00 | $26.00 | 2 |
| OPEN 10-17-2000 | $4.00 | $15.00 | 7000 |

820

[WRITE DELTA CONTRACTS]  [BUY DELTA CONTRACTS]

*FIG. 8*

PUTS — 850
| EXPIRY | Δ CHANGE PREMIUM | PREMIUM | QUANTITY AVAILABLE |
|---|---|---|---|
| CLOSE 10-16-2000 | $1.75 | $30.00 | 50 |
| CLOSE 10-16-2000 | $2.25 | $31.00 | 75 |
| OPEN 10-17-2000 | $0.50 | $40.00 | 400 |
| OPEN 10-17-2000 | $1.50 | $42.00 | 5 |
| NOON 10-17-2000 | $2.00 | $38.00 | 760 |
| NOON 10-17-2000 | $1.25 | $58.00 | 25 |
| CLOSE 10-17-2000 | $3.00 | $32.00 | 200 |
855, 840, 841, 842, 843
CALLS — 860
| EXPIRY | Δ CHANGE PREMIUM | PREMIUM | QUANTITY AVAILABLE |
|---|---|---|---|
| CLOSE 10-16-2000 | $1.50 | $5.00 | 4 |
| CLOSE 10-16-2000 | $2.00 | $35.00 | 25 |
| CLOSE 10-16-2000 | $2.25 | $33.00 | 76 |
| OPEN 10-17-2000 | $1.00 | $55.00 | 40 |
| OPEN 10-17-2000 | $1.50 | $46.00 | 26 |
| OPEN 10-17-2000 | $3.00 | $26.00 | 2 |
| OPEN 10-17-2000 | $4.00 | $15.00 | 7000 |
| OPEN 10-17-2000 | $3.00 | $26.00 | 2 |
| OPEN 10-17-2000 | $4.00 | $16.00 | 500 |
| NOON 10-17-2000 | $2.00 | $25.00 | 50 |
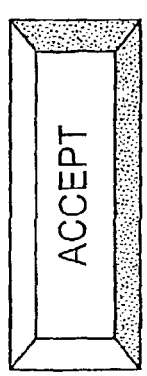
ACCEPT
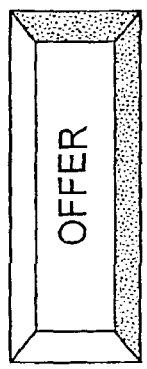
OFFER
FIG. 8 CONT.

CSCO

| 10-16-2000 | CURRENT PRICE: $56.20 | TODAY'S OPEN: $56.15 | YESTERDAY'S CLOSE: $49.85 |

PUTS

| SIDE TAKEN | EXPIRY | | ΔCHANGE | PREMIUM | QUANTITY AVAILABLE |
|---|---|---|---|---|---|
| WRITE | CLOSE | 10-16-2000 | $1.25 | $47.00 | 250 |
| WRITE | CLOSE | 10-16-2000 | $2.25 | $33.00 | 375 |
| WRITE | OPEN | 10-17-2000 | $3.00 | $26.00 | 4000 |
| WRITE | OPEN | 10-17-2000 | $1.50 | $42.00 | 5 |
| WRITE | NOON | 10-17-2000 | $2.00 | $38.00 | 760 |
| BUY | CLOSE | 10-16-2000 | $1.00 | $55.00 | 72 |
| BUY | OPEN | 10-17-2000 | $3.00 | $33.00 | 600 |
| BUY | CLOSE | 10-17-2000 | $4.00 | $15.00 | 23 |
| BUY | OPEN | 10-18-2000 | $1.00 | $6.00 | 110 |

910 / 930

CALLS

| SIDE TAKEN | EXPIRY | | ΔCHANGE | PREMIUM | QUANTITY AVAILABLE |
|---|---|---|---|---|---|
| WRITE | CLOSE | 10-16-2000 | $1.00 | $5.00 | 4 |
| WRITE | CLOSE | 10-16-2000 | $1.75 | $35.00 | 25966 |
| WRITE | OPEN | 10-17-2000 | $2.25 | $33.00 | 76 |
| WRITE | OPEN | 10-17-2000 | $1.00 | $55.00 | 1400 |
| BUY | CLOSE | 10-16-2000 | $1.50 | $45.00 | 26 |
| BUY | OPEN | 10-17-2000 | $3.00 | $26.00 | 2 |
| BUY | NOON | 10-17-2000 | $4.00 | $15.00 | 7000 |

920 / 935

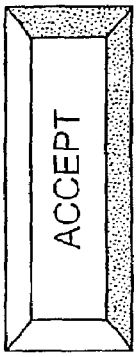 OFFER  ACCEPT

FIG. 9

DERIVATIVE SECURITIES AND SYSTEM FOR TRADING SAME

FIELD OF THE INVENTION

The present invention generally relates to a computer-based method and system for trading derivative securities. In particular, the present invention provides for a new type of derivative security whose value is determined by whether an underlying instrument will trade above or below a given price at a given time. The present invention also provides a platform for trading the derivative security.

BACKGROUND OF THE INVENTION

The advent of the Internet and electronic trading has completely changed how people invest in the stock market. While once the stock market was almost exclusively the domain of powerful businessmen with only a very small percentage of the public actually owning stock, today the stock market is part of everyday life for the vast majority of Americans. More people own equities, either directly or indirectly through mutual funds and pension funds, than at any time before.

In the first half of the twentieth century, a stockbroker was typically the intermediary between the investing public and the stock market. These brokers would "read the ticker tape" as it came out on long ribbons, and would then convey this information to their clientele at opportune moments. As technology has advanced, the ticker tape has been replaced by electronics, greatly enhancing the efficiency of price dissemination and lowering the learning curve needed to trade on the stock market.

With the advances in technology, the brokerage industry has also changed. Technological advances such as Electronic Communications Networks (ECNs) and the Small Order Execution System (SOES) and new and better access to research information have come together to empower the individual investor. The self-motivated investor does not need a brokerage firm to get research information, it is all available over the Internet. While once brokerages were almost exclusively full-service, offering investment advice and a multitude of financial services, today people have the choice of using discount brokers and online brokers to invest in the market. A discount broker offers access to the markets without all the advice a client typically gets from a full-service firm. As a result, those using a discount broker pay less to conduct transactions than a person doing business at a full-service firm does. Reduced trading commissions, sometimes more than 50% less than traditional full-service brokerage firms, are available to individual investors through discount brokers.

The automated systems associated with trading on the Web have reduced the broker's cost of executing trades, and therefore deep-discount online brokerages have been developed. These online brokers have enabled a large number of do-it-yourself investors to trade securities completely independent of financial advisors and stockbrokers. The Internet brokerage industry is currently executing more than 800,000 trades a day. The largest online brokerage firms have nearly 2 million accounts, and at least one stock trade in seven is executed over the Internet.

There are basically two types of people that participate in the stock market the—"investor" and the "trader". The buy and hold investor has a long-term view of the market and buys securities with the intention of holding them through market ups and downs. The "institutional investor" makes investments and trades stocks on behalf of other people. Institutional investors buy and sell large quantities of stocks and may qualify for preferential treatment and lower commissions by trading large enough quantities. In the past, almost all trades made on the stock market were made through institutional investors. However thanks to the advent of discount and online brokerages, individuals who wish to invest in the market now have an abundance of information and electronic trading services available to them to make their own transactions.

A "trader", as opposed to the buy-and-hold investor, is a person who buys and sells often, even intraday, with the objective of short-term profit. A trader looks for price swings and situations for profitable trading. Traders constantly monitor market moves, looking for trends, trend reversals, breakouts and all manner of stock movements.

Increasingly, individuals ("retail traders") are speculating in different types of securities using online brokerages. Retail traders may be individuals who actively follow the financial markets, and like the excitement of speculating. Typically, these investors are young and have relatively high incomes, but have a lower net worth than traditional, full-service brokerage clients. They tend to trade frequently; at least a few times a week. A "day trader" is a retail trader who buys and sells stocks or options intraday, looking more for quick profits than long-term capital appreciation.

Several types of existing securities and trading methods are currently popular with retail traders speculating in the financial market, including financial futures contracts, exchange-based options, trading on margin and selling a stock short. Each of these types of traditional securities or trading methods has significant disadvantages to the retail trader.

A futures contract is an agreement from a buyer to accept delivery (or for a seller to make delivery) of a specific commodity, currency or financial instrument for a predetermined price by a designated date. Most futures contracts are bought on speculation about future prices, and most futures traders are speculators (i.e., they do not expect to take delivery of the product). Speculators intend to buy low and sell high. They make money by forecasting price movement. In the futures markets, speculators not only have to forecast price movement, but they also need to predict when a price will be higher or lower. This makes trading in futures more risky than trading in stocks. Owning a futures contract exposes the trader to theoretically unlimited risk if the position moves against him and he is unable to close it out due to market circumstances. In addition, many retail traders cannot invest in futures contracts because of the significant net worth required to trade futures.

An option is a trading instrument that represents the right to buy (call) or sell (put) a specified amount of underlying security at a predetermined fixed price within a specified time. The underlying security can be stock, indexes, bonds, currencies or futures contracts. The fixed price, or "strike price", is the price at which the security underlying an option can be purchased (call) or sold (put).

The option purchaser pays a premium for the right, but not the obligation, to exercise the specifics of the option contract. An option is worthless upon expiration, and the premium paid for the option cannot be recouped. The option seller assumes a legal obligation to fulfill the specifics of the contract if the option is assigned to him or her, however the premium is the extent of the potential risk to the option buyer. It is a payment to the seller of the option to tie up the obligation on the security for the requisite time period—the longer the period, the higher the premium. Options lose value with time. This "time decay" is part of the premium paid for the option. Time value will decay, or disappear, as the option approaches the expiration date.

Options can be used in a variety of ways to profit from a rise or fall in the market. Buying an option offers limited risk and unlimited profit potential. Selling an option, however, comes with an obligation to complete the trade if the party buying the option chooses to exercise the option. Selling an option therefore presents the seller with limited profit potential and significant risk unless the position is hedged in some manner.

There are two types of options—calls and puts. A call option contract gives the holder the right, but not the obligation, to buy a specified amount of an underlying security at a specified price within a specified time in exchange for a premium. The call option buyer hopes the price of the underlying stock will rise by the call's expiration, while the call option seller hopes that the price of the underlying stock will decline or remain stable.

A put option contract gives the owner the right, but not the obligation, to sell a specified amount of an underlying security at a specified price within a specified time in exchange for a premium. The put option buyer hopes the price of the underlying stock will drop by a specific date, while the put option seller hopes the price of the underlying stock will rise or remain stable.

The strike price is the fixed price at which the security underlying an option can be purchased (call) or sold (put) at any time prior to the option's expiration date if the option is exercised. An option's expiration date designates the last day on which an option may be exercised. American-style options can be exercised at any time before the expiration day, while European-style options can be exercised only on the expiration date. Exchange traded options have an expiration month, and American-style options expire on the third Saturday of the expiration month.

An option's premium denotes the actual price a trader pays to buy an option or receives from selling an option. The "bid" is the highest price a prospective buyer is prepared to pay for a specified time and the "ask' is the lowest price acceptable to a prospective seller. Together, the bid and ask prices constitute a quote and the difference between the two prices is the bid-ask spread.

Option pricing is a complex process. There are several major components that affect the premium of an option, including the current price of the underlying security, the type of option, the strike price as compared to current market price (the option's intrinsic value), the amount of time remaining until expiration (the option's time value) and the volatility of the underlying security.

In general, an option's premium is its intrinsic value plus its time value. "Intrinsic value" measures the amount by which the strike price of an option is in-the-money in relation to the current price of the underlying stock. A call option whose strike price is above the current market price of the underlying security has no intrinsic value. A put option whose strike price is below the current market price of the underlying security has no intrinsic value. The time value is simply the option value less the intrinsic value. As the option approaches expiration, the time value goes to zero. At expiration the only value in an option, if any, is its intrinsic value.

The time value portion of the option premium depends on volatility. "Volatility" is a percentage that measures the amount by which an underlying security is expected to fluctuate in a given period of time. Basically, it is the speed of change in a market. Options often increase in price when there is a rise in volatility even if the price of the underlying security doesn't change. Options of a high-volatility stock generally command a higher premium because they have a greater chance of making a big move and being in-the-money by expiration.

Historical volatility measures a stock's propensity for movement based on the stock's past price action during a specific time period. Implied volatility is a computed value that measures an option's volatility, rather than that of the underlying security. The fair value of an option is frequently calculated by entering the historical volatility of the underlying security into an option-pricing model, such as the Black-Scholes for stocks. The computed fair value may differ from the actual market price of the option. Implied volatility is the volatility needed to achieve the option's actual market price. For example, if the market price of an option rises without a change in the price of the underlying security, implied volatility will have risen.

Exchange-traded options are not efficient for a retail trader for a number of reasons. First, exchange-traded options tend to have a wide bid/ask spread. The market maker or specialist at the exchange prices a significant markup into the two-way quote he offers to the market. This spread, which covers his hedging costs and profit, can make short-term options trading costly and generally inefficient. Traditional exchange-traded options have significant levels of time value and implied volatility, the movement of which can cost a speculator returns even if he is right on the movement of the underlying index or stock. This can make options trading extremely expensive for traders speculating on relatively small moves in the market. For example, the transaction costs on a representative at-the-money call on the S&P 500, including commissions and bid/ask spread, may be close to 15% of the premium, while the minimum trade size may average approximately $1500 per contract. The implied volatility of an option fluctuates, which can cost the trader potential gains even if the market moves in the predicted direction. In addition, the minimum trade size may be an obstacle for many retail traders.

Over-the-counter options and contracts have the same types of limitations as do exchange-traded options, and are additionally limited to institutional investors in blocks typically of $1 million or more. Therefore, they are also inadequate for retail traders to speculate in the market.

Retail traders may also speculate by buying on the margin. Buying stocks on margin is limited by Federal Reserve regulations. In addition, the risk of a margin call makes this type of trading risky. Short selling stocks is also risky, and requires substantial margin.

Meanwhile, new regulations at the Securities and Exchange Commission (SEC) have spawned the development of the Alternative Trading System (ATS)—an ATS is a new method of trading financial instruments (stocks, bonds, currencies, option, etc.) on an electronic platform that directly connects buyers and sellers. Trades on an ATS bypass exchanges and dealer networks. The development of Alternative Trading Systems has led to greater parity between institutional and retail investors. However, these systems are still limited to traditional securities.

In view of the foregoing, it can be appreciated that a substantial need exists for a financial instrument that provides for speculating in the market with a small minimum trade size, no required net worth and limited risk, while still providing high leverage capabilities. In addition, a need exists for a trading system designed to trade such a new financial instrument.

SUMMARY OF THE INVENTION

The present invention solves these problems by providing a derivative security whose value is determined by whether an underlying instrument will trade above or below a given price at or by a given time. Basically, the price of the underlying instrument in the inventive instrument must move a certain amount in a certain direction in a limited amount of time. If it does, that trade yields a fixed amount of money for the buyer or acceptor of the contract. If it does not, that acceptor has lost only the premium he paid for the contract. Unlike traditional futures and options, the inventive instrument is keyed to a change in value of an underlying instrument, not its absolute value.

In addition, the present invention provides for a system to trade the inventive derivative security that allows any participant to post offers or fill orders from posted offers, with order flow coming from individual investors via online brokerages, institutions, and specialists and market makers.

Accordingly, the present invention provides for a method of creating a financial product, wherein said method comprises: identifying an underlying instrument, said underlying instrument having a first price corresponding to a market price of the underlying instrument at a first time; identifying an expiry; identifying a premium to be paid by a buyer of the financial product; identifying a payout; identifying a value change in the underlying instrument; wherein said financial product is worth the payout amount to a buyer of the financial product if, between the first time and expiry, the market price of the underlying instrument meets a strike price, wherein the strike price is a sum of the first price and the value change; and wherein said financial product is worth nothing to the buyer if, between the first time and expiry, the market price of the underlying instrument fails to meet the strike price.

With these and other advantages and features of the invention that will become hereinafter apparent, the nature of the invention may be more clearly understood by reference to the following detailed description of the invention, to the appended claims and to the several drawings attached herein.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 3 is screenshot of an example marketplace for DELTA contracts in one embodiment of the present invention. In this example, each DELTA contract uses Cisco common stock as its underlying instrument;

FIG. 4 is an interface that may be used to design and offer a DELTA contract in one embodiment of the present invention;

FIG. 5 is a screenshot illustrating an updated marketplace once the contract designed in FIG. 4 has been entered into the marketplace of FIG. 3;

FIG. 6 is an interface for buying available DELTA contracts in one embodiment of the present invention;

FIG. 7 is a screenshot illustrating an updated marketplace once the contracts in FIG. 6 have been purchased from the marketplace of FIG. 5;

FIG. 8 is an example marketplace for DELTA offers in a second embodiment of the present invention;

FIG. 9 is an example marketplace for DELTA offers in a third embodiment of the present invention.

DETAILED DESCRIPTION

Figure 1:
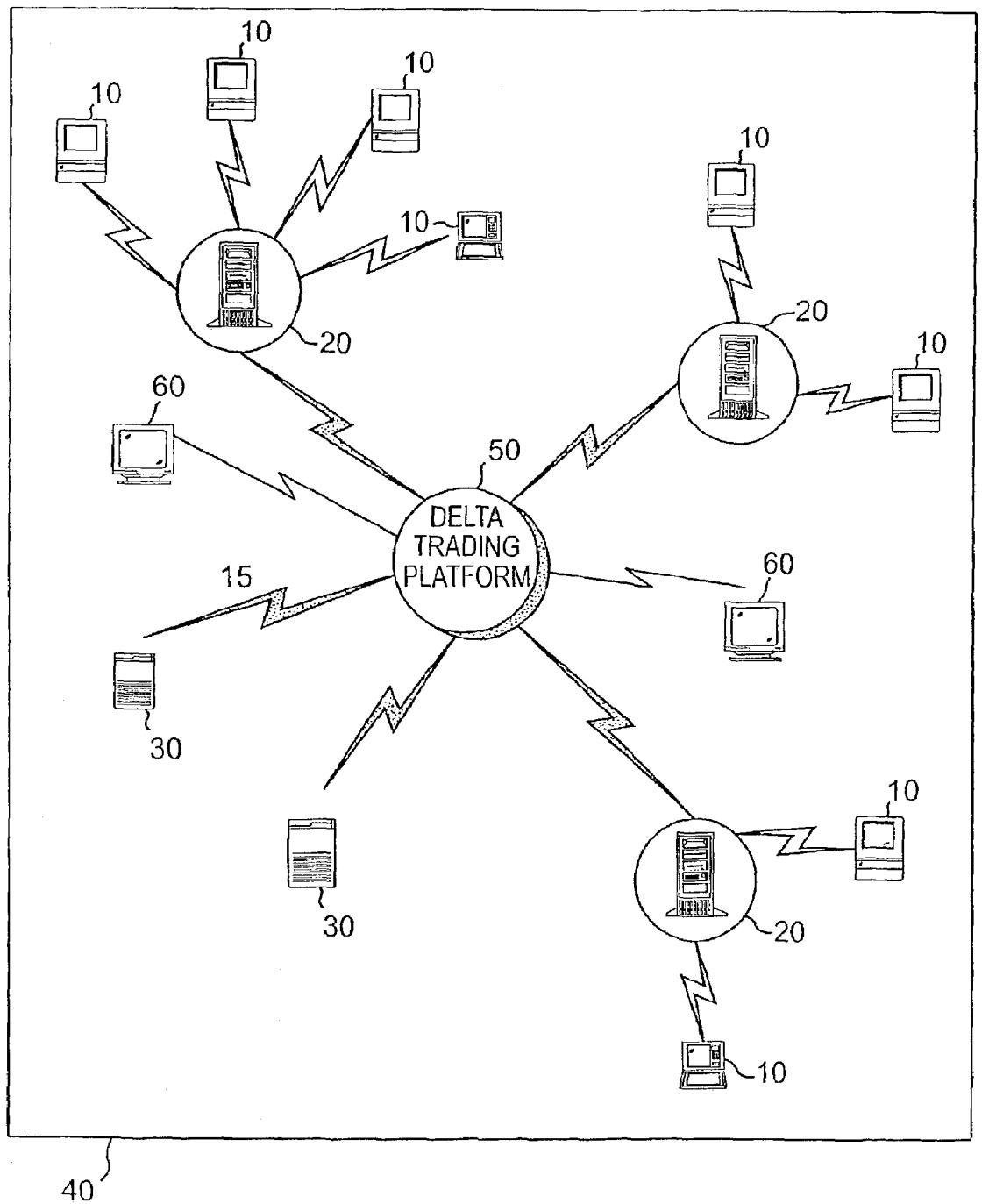
FIG. 1 illustrates a trading network according to one embodiment of the present invention.

Reference will now be made in detail to the embodiments of the invention, examples of which are illustrated in the accompanying drawings. Wherever possible, the same reference numbers will be used throughout the drawings to refer to the same or like components.

It is worthy to note that any reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Retail traders encounter significant obstacles when speculating in the market using traditional securities. The minimum trade size, bid/ask spread and risk involved when trading futures and options deters many retail investors from trading in these traditional securities. However, many retail investors closely follow the markets, and can successfully predict market movements. Yet, they are unable to capitalize on their insight as current securities and trading systems do not easily allow for such speculative activity from retail traders.

DELTA Contract

The present invention solves these problems by introducing a financial instrument that is intended to be used to speculate on market movements. Unlike many current financial instruments, the financial instrument of the present invention is a pure derivative with no intrinsic value.

The inventive financial instrument is a derivative contract, the Derivative Electronically Linked Trading Auction (DELTA) contract, whose value is determined by whether an underlying instrument will trade above or below a given price at or by a given time. Basically, the price of the underlying instrument in the inventive instrument must move a certain amount in a certain direction in a limited amount of time. If it does, that trade yields a fixed amount of money for the buyer or acceptor of the contract. If it does not, that acceptor has lost only the premium he paid for the contract. Unlike traditional futures and options, the inventive instrument is keyed to a change in value of an underlying instrument, not its absolute value. In addition, unlike traditional instruments, the contract of the present invention settles in cash instead of stock or other underlying security.

There is no limit to the number of DELTA contracts that may be offered, because the DELTA contract is a pure derivative. The value of the DELTA contract is directly correlated to the value of the underlying instrument by the time of expiry.

There is no ownership of the underlying instrument at any time. This is in contrast to the exchange traded options market, which is limited by the underlying instrument.

The underlying instrument in the DELTA contract may be any type of instrument. The underlying instrument may be a security, such as stock or futures contracts. Other examples of instruments that may be used as the underlying instrument in the present invention include currencies, commodities, market indices, mutual funds, interest rates and insurance contracts. The underlying instrument may even be based on risk measurements, real estate or even sporting events. Any instrument that can demonstrate a measurable difference in value or price over a set period of time can be used as the underlying instrument in the present invention.

The inventive financial instrument is a contract that a trader designs himself. When designing a contract, the trader may set the type of the contract, strike change in value, expiration and number of contracts to offer, as well as the premium, and whether he wishes to be an offeror or acceptor. Any participant in the inventive trading system can design and offer a DELTA contract, and any participant can accept an offer of a DELTA contract, whether an institutional investor or retail trader. These functions allow a degree of customization not offered by exchange traded options, or any other type of listed derivative.

The strike price in the inventive financial instrument is determined not by an absolute value, rather it is determined by the amount of change in value of an underlying instrument from a predetermined time prior to execution. The amount of change can be a positive or negative amount. In addition, as time passes—the strike price may change for contracts that have been offered but not yet accepted. The strike price is determined by the price of an underlying instrument a specific time prior to or at the time the contract is accepted and the strike change in value specified in the offered contract.

Basically, the formula for determining the strike price is:

Strike price=price of the underlying instrument at a specific time prior to or at execution+the strike change in value specified in the contract.

As described, the determination of the strike price depends on the price of the underlying instrument at a specified time. In one embodiment, the specified time is the time the contract is executed. However, the specified time may be a time before the contract is offered. For example, the contract may specify that it will use the closing price of the underlying instrument on the day the contract is offered. As another example, the specified time may be correlated to the contract's expiry. As will be obvious to one skilled in the art, there are many different ways of specifying a time, and it is intended that the scope of the present invention cover these various methods.

In one embodiment, there are two types of DELTA contracts—put and call. If the offered contract is a put contract, the trader who buys the contract believes that the price of the underlying instrument will decline from the price of the underlying instrument at the time of execution of the put contract or some other specified time, to a price that is less than the strike price at or by the time of expiry of the put contract. In the case of a put DELTA contract, the buyer of the put contract pays the offeror or writer of the put contract a contract premium and, in exchange, the buyer will earn the contract payout amount (e.g. $100 or other set amount) if the contract expires "in the money." More particularly, if the price of the underlying instrument falls below the strike price between execution or some other specified time, and expiry of the put contract, the contract is deemed to have expired "in the money", and the trader who wrote the contract will pay the trader who accepted the contract the contract payout amount (e.g. $100 in the current example). If the value of the underlying instrument fails to fall below the strike price between the time of execution or some other specified time and expiry, the contract is not deemed to be "in the money," and the offeror of the contract pays the acceptor of the contract nothing upon expiry. In either case, the trader that offered the contract keeps the premium paid to accept the contract.

If the offered contract is a DELTA call contract, the trader who accepts the contract believes that the price of the underlying instrument will rise from the price of the underlying instrument at the time of execution of the call contract, or some other specified time, to a price that is greater than the strike price at or by the time of expiry of the call contract. In the case of a call DELTA contract, the acceptor of the call contract pays the offeror of the call contract a contract premium and, in exchange, the acceptor will earn the contract payout amount (e.g. $100 or other set amount) if the contract expires "in the money." More particularly, if the value of the underlying instrument rises above the strike price between execution, or some other specified time, and expiry of the call contract, the contract will pay the trader who accepted the contract the contract payout amount (e.g. $100 in the current example). If the underlying instrument price fails to rise above the strike price between the time of execution, or some other specified time, and expiry, the contract will be deemed to not have expired "in the money," and the offeror of the contract will be deemed not to have expired "in the money," and the offeror of the contract pays the acceptor of the contract nothing upon expiry. In either case, the trade that offered the contract keeps the premium paid to purchase the contract.

In another embodiment, the contracts do not have a type. In this embodiment, the strike change in value is either a positive or negative number. If the strike change in value is a positive number, the contract acts like a call contract, wherein the strike price is determined by adding the price of the underlying instrument at the time of execution or some other specified time to the strike change in value specified in the contract. If the price of the underlying instrument rises to meet or exceed this price before expiry, the contract is "in the money." Alternatively, if the strike change in value is a negative number, the contract acts like a put contract, wherein the strike price is determined by subtracting the strike change in value from the price of the underlying instrument at the time of execution or some other specified time. If the price of the underlying instrument falls to or below the strike price before expiry, the contract expires "in the money."

In addition, the contracts described thus far are similar to "American-style" options, in that a contract is "in the money" if it meets the strike price at any time before expiry, regardless of the price of the underlying instrument at the exact time of expiry. In an alternative embodiment, the DELTA contracts could follow "European-style" contracts, wherein they are only "in the money" if the price of the underlying instrument meets or exceeds the strike price at the time of expiry (in the case of call contracts), or if the price of the underlying instrument meets or is below the strike price at the time of expiry (in the case of put contracts).

The inventive financial instrument may have several choices available for expiry, including multiple expiries per day. For example, a contract may expire at open, noon or close. As another example, the contracts may have hourly expiries available. By allowing expiration at different times of the day, the inventive financial instrument enables a trader to capitalize on short-term, intraday price swings. Multiple daily expiries allow for trading around specific events, such as earnings releases. In addition, it enables the financial instrument of the present invention to be used as an innovative hedging tool.

The inventive contracts are binary. That is, they expire at either full value or no value. The value of the contract is directly correlated to the value of the underlying instrument at the time of expiry. For example, in the case of a call that expires at close on a particular day, if the underlying instrument is a stock that is trading above the strike price at closing time, the contract expires at a fixed dollar amount (referred to above as the "contract payout amount."). If the stock closes below the strike price, the contract is worth $0.

An investor pays a premium for a contract with the knowledge that it will be worth either the contract payout amount ($100 in the above example) or $0 upon expiration. The premium is based upon the magnitude of the move the value of the underlying instrument must make at expiry in order to equal or exceed the strike price. For example, if an investor believes that Cisco stock will close up today, he may choose to pay $50 to receive $100 if Cisco stock does close up 1 point or more, $35 if he believes it will close up 2 points or more; or $10 is he believes Cisco stock will close up 5 points or more. In general, the greater the move of the underlying instrument needed to reach the strike price, the cheaper the premium.

Any participant in the trading platform of the present invention can design and offer his own contract, or accept any offered contract. All participants have equal access to information and data regarding the market, regardless of whether the participant is a retail trader or an institutional market maker. In the present invention, institutions, market makers and individual traders access the system and post offers on the same basis, with either eligible to buy or sell at any time, to any other trader in the network.

Trading System for Trading the DELTA Contract

The embodiments of the invention include an electronic trading platform that supports the trading of the financial instrument of the present invention. The trading platform of the present invention allows participants to post offers or fill orders from posted offers, with order flow coming from individual investors via online brokerages, institutions, and specialists and market makers. It is important to note that the order flow moves in both directions—any trader can buy from or sell to any other trader at any time. This is different from the current, linear structure, where orders are sent into market makers—a closed universe of institutions—executed on a basis inherently favorable to these institutions and specialists, then sent back out to individual traders.

It is a feature of the present invention that both retail investors and market makers benefit from using the inventive trading system. Retail investors benefit from the ability to trade directly with institutions on equal footing. Market makers can use their expertise in pricing derivatives and hedging market exposure to operate profitably. This profitability should encourage specialists and market makers to bring their capital to the inventive system, thereby creating liquidity in the marketplace.

All participants in the trading platform of the present invention trade on an equal footing. Retail traders can trade directly with other retail traders, or can sell directly to an institution. In these situations, trading is being conducted without any intermediate market makers. This is unlike any traditional securities exchange.

FIG. 1 illustrates the various elements of the trading system of the present invention. As shown, retail traders 10 may participate in the trading system 40 through online brokerages 20. Institutional investors 30 may be directly connected with the trading platform 50 of the present invention, subject to certain regulatory guidelines.

Trading platform 50 is typically a server, or set of servers, that maintains a universe of contracts that are available for trading. Traders submit contracts to the trading platform to be offered and accepted, the trading platform maintains a set of live offered contracts, and executes contract purchases. The trading platform may be implemented on a server that maintains a database, or set of databases, in which information about the contracts is stored and updated in real-time.

In one embodiment, traders submit contracts and purchase contracts through a registered broker-dealer. If the trader is an institutional investor or a market maker, the institution could have direct connection with the trading platform of the present invention, as shown by the connection 15 between Institutional Investor 30 and Trading Platform 50. Retail traders 10 generally must go through an online broker 20 to connect to the trading platform to offer and trade contracts. For instance, a retail trader may log into his account with Schwab, and Schwab may then offer the trading platform of the present invention as an available marketplace for the trader. The trader accesses the trading platform of the present invention directly through Schwab. Alternatively, the trader may use an ECN on a portal such as yahoo.com to connect to his online broker. While the trader will still have to enter his broker's account information, he will not necessarily have to go through the online broker to access and trade on the trading platform of the present invention. However, an account with a broker/dealer is needed to clear and settle transactions, and therefore to offer and purchase contracts.

In addition, there may also be viewers 60 that can display information about the universe of available contracts that do not require a trader to go through a broker to view information about the marketplace. For example, a financial or general purpose website, such as yahoo.com, may offer a viewing portal into the marketplace. In this portal, the user may view such information as volume of trades, currently offered contracts, etc. Any person will generally be able to view such information about the present marketplace whether he has an online trading account or not. Generally traders cannot offer or trade contracts through a viewer, but can only view information about the marketplace through a viewer.

As contracts are offered and executed, the trading platform maintains a universe of what is currently available and at what price. The trading platform dynamically and reflexively updates the universe in real-time. The universe of live contracts that are available for trading is preferably shown as a matrix. The matrix may first be sorted by underlying instrument, then by type of contract, strike price and expiry, for example.

There are many known ways to implement a user interface that will allow the user to conduct trading. In addition, in one embodiment traders that access the trading platform through different brokers may encounter different interfaces as each broker may implement its own interface to the trading platform. In this embodiment, the brokers are given interface parameters and standards, and they develop their own interface to the trading platform. The matrix server will send out various set fields of data and require data to be sent in a specified format. In an alternative embodiment, the trading platform may also be accessed through dedicated kiosks and/or terminals. In addition, retail traders may be able to buy and sell DELTA contracts through their brokers by telephone, in-person visits and through other traditional means currently available as well. However, the primary method of accessing the trading platform is through a website. FIGS. 2-7 illustrate example screens and interfaces that may be used to conduct trading on the trading platform of the present invention.

There may also be features to the trading interface that are not shown in FIGS. 2-7. For example, the interface may offer derivatives pricing calculator, such as Black-Scholes, for example. Other features and add-ons are known to those skilled in the art and are intended to come within the scope of the present invention.

Figure 2:
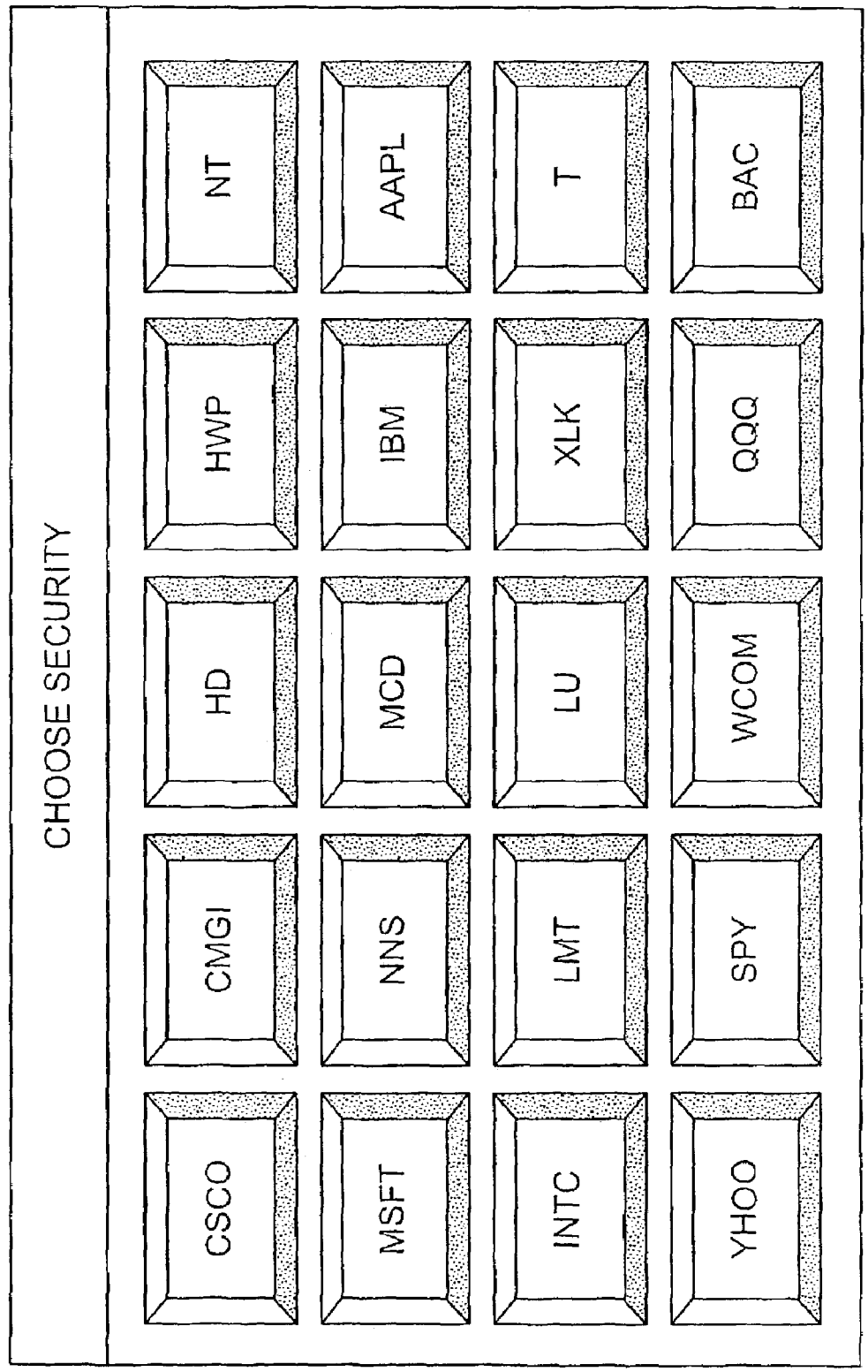
FIG. 2 is an example of a matrix that may be shown to a user upon entering the trading platform of the present invention.

FIG. 2 illustrates an example of a matrix that may be shown to a user upon entering the trading platform in one embodiment of the present invention. In this example, there are twenty securities or indices that may be used as the underlying instrument for the inventive derivative contract. In alternative embodiments, more or fewer instruments may be available. As discussed above, it is possible to use other types of instruments, such as mutual funds, futures contracts or options, as the underlying instrument. Many different types of instruments, and combinations of instruments, are known to those skilled in the art, and use of such other types of instruments (and combinations thereof) as the underlying basis for a DELTA contract is intended to come within the scope of the present invention. For example, as shown in FIG. 2, market indexes may also be used as the underlying basis for a DELTA contract.

The matrix interface shown in FIG. 2 illustrates one possible interface for entering the trading platform of the present invention. Other interfaces are possible, and are intended to come within the scope of the present invention. For example, the entry screen may resemble a traditional list of securities with their trade data. As another example, the entry screen may contain pulldown menus as a method of writing and offering contracts without entering a separate trading platform interface.

In the example shown in FIG. 2, the trader selects Cisco (CSCO) as the underlying instrument of interest. FIG. 3 illustrates an example of the marketplace of available inventive derivative contracts for CSCO stock. The screenshot shown in FIG. 3 displays such basic information as current price 305 of CSCO stock, the day's opening price 308 of CSCO stock, and the previous day's closing price 309 for CSCO stock. Price information 305, 308, 309 is gathered from real-time market data sources. This type of real-time market data is a standardized, regulated commodity known to those skilled in the art. The current price shown is typically the price of the last executed trade. In FIG. 3, the current price 305 is the price of the most recent trade for CSCO stock. This information is constantly being updated.

In the example shown in FIG. 3, there are a number of DELTA call contracts 330 and DELTA put contracts 320 available. Each of the call contracts 330 and put contracts 320 shown in FIG. 3 use CSCO stock as the underlying instrument upon which the contract is based. In an alternative embodiment, the marketplace may display available contracts that have different underlying instruments.

A number of parameters are shown for each available contract. First each available contract has an expiration date and time. As discussed earlier, the trading platform of the present invention may allow for many different expiries, from long-term monthly expirations to hourly expirations. In the example shown in FIG. 3, the contracts may expire at open, noon or close on a given trading day. The specific expiration date and time for any given contract is shown in the "expily" column 340 in FIG. 3.

The strike price of the contract is calculated from the "Δ Change" parameter, shown in the "Δ Change" column 345. The "Δ Change" associated with a given contract is the amount that the price of the underlying instrument must move up or down by expiry from its specific prior price for that contract to be "in the money." The "Premium" column 350 lists the premium that a trader who accepts a contract is required to pay the offeror of the contract. As mentioned above, a contract offeror retains the premium for the contract, regardless of whether the contract expires "in the money." In the embodiment shown in FIG. 3, each contract shown has a contract payout amount of $100, i.e., the contract offeror pays the contract acceptor $100 if the contract expires in the money. As will be obvious to those skilled in the art, contracts could be set up to pay out at different amounts. In one embodiment, every contract in the trading platform has the same payout amount. In an alternative embodiment, the contract payout amount is dependent on the underlying instrument. In yet another embodiment, the contract offeror may determine the payout amount of a contract. The "# of contracts offered" column 360 shows how many contracts are available for each different contract in the market.

In the embodiment shown, the trader may choose to write and offer his own contract to the marketplace, or trade available contracts using buttons 380 and 390. As will be obvious to one skilled in the art, it is possible to use alternative types of interfaces to select contract writing and trading functionality. For example, in an alternative embodiment, the trader may click, or double-click, on a particular line in the matrix to proceed to the contract trading interface. It is intended that the scope of the present invention cover such alternative embodiments.

FIG. 4 illustrates an example interface that may be used to design and offer a contract into the marketplace, should the user click on "Write DELTA Contract" button 380. As shown in FIG. 4, in this embodiment the user (or contract offeror) must enter or select values for several parameters. First, the user selects whether he wishes the contract to be a put or call contract. In the embodiment shown in FIG. 4, the user has selected "Put" from the pulldown menu 410. The user also selects an expiration date and time for the contract. In this embodiment, the user is given the option of selecting current, next day and second day expiration times of open, noon and close. In this example, the user is designing the contract on Oct. 16, 2000, and therefore the system determines that the available options for expiration are those shown in the pulldown menu 420. As is obvious to those skilled in the art, there are many different ways of determining valid expiration times to offer to the user designing the contract. In an alternative interface, the user could enter an expiration date and time. The system could then confirm the validity of the entered date and time.

Although not shown in FIG. 4, in an alternative embodiment the user may also be given the option of entering or selecting a secondary expiry value. This secondary expiry value determines how long the contract may be listed as an available contract. In other words, the secondary expiry acts as a "timeout" value. If the contract is not accepted before the secondary expiry, the contract will timeout-that is, it will be delisted and will no longer be available for another trader to accept. The timeout expiry may be an absolute time, for example, the user may select that the contract timeout at market close on Oct. 17, 2001 if it is not accepted. Alternatively, the timeout may be a certain amount of time after contract creation. For example, if the contract is accepted within 24 hours from the time is created, or offered into the marketplace, it will be delisted and will no longer be available for another trader to accept. In addition, a trader may offer a certain quantity of contracts. If some of the contracts are accepted before the timeout expiry, only those that are still available will be delisted from the marketplace at timeout expiry.

In yet another alternative embodiment, the user may also select or enter an expiration value. In this embodiment, if the current market value of the underlying instrument reaches this value before the contract is accepted, it will be delisted. The expiration value may be an absolute amount, such that if the price of the underlying instrument reaches this value at any point before expiry, it will be delisted. Alternatively, the expiration value could represent a shift in the underlying value during the life of the offered contract. For example, the user may choose an expiration value of 10%. In this case, if the value of the underlying instrument increases or decreases more than 10%, it will be delisted. In addition, the timeout expiry may also be used in conjunction with the expiration value, such that an offered contract will be delisted if it reaches a certain value within a certain amount of time. Other methods of creating and calculating timeout expiries, expiration values, and combinations thereof, will be obvious to one skilled in the art, and are intended to come within the scope of the present invention.

In addition, contracts may have parameters that control how the contract is traded after hours. In the hours the market is closed, a different set of rules that control how the DELTA contracts are traded may be implemented. For example, the timeout procedure may be implemented in a different way during after-market hours. These after-market hours trading rules may be set by the trader, or may be system-wide rules. In particular, there may be specific after-hour trading rules that consider the contract creation time and timeout values to ensure that contracts do not outlive the contract offeror's expectations.

In FIG. 4, the user also selects a "$ Change" at pulldown menu 430. For the CSCO derivative contract in this example, the user is given the option of selecting changes from $0.25 to $4.00 in $0.25 increments. The "$ Change" is the "strike change in value", and corresponds to the amount by which the price of the underlying instrument must move up or down for the contract to be "in the money." The options available for "$ Change" may be different for different underlying instruments. Alternatively, the user may enter a "$ Change", and the system will determine the validity of the entered value.

The user also enters a premium for a contract in FIG. 4. In this example, the user can enter any dollar amount. The system may perform error-checking on the entered value. For example, the system may disallow values less than $0.25 and greater than $100.00. The user also enters the number of contracts with these parameters that he wishes to offer. Again, the system may perform error-checking on the entered value.

In the embodiment shown in FIG. 4, each contract shown has a contract payout amount of $100. As will be obvious to those skilled in the art, contracts could be set up to pay out at different amounts;.

In the example shown in FIG. 4, the system builds the contract in section 480 as the user enters values for the contract parameters. Once the user has entered or selected values for each required parameter, he then clicks the Confirm button to confirm that he wants to offer these contracts into the marketplace.

After the contract is offered into the marketplace, the universe of available contracts is updated, and the matrix that is displayed to the traders is updated. FIG. 5 illustrates the marketplace matrix that has been updated to include the contracts designed in FIG. 4. These contracts are shown by contracts 510 in FIG. 5.

After the contract is offered, there are three possible outcomes to the offeror of the contract. In the first outcome, the offeror wins, i.e., the offeror is not required to pay the contract payout amount to the acceptor. In the second outcome, the offeror loses, i.e., the offeror is required to pay the contract payout amount to the acceptor. In either of these outcomes, the offeror keeps the premium paid by the trader who accepts the contract. In the third outcome, the contract is offered on the exchange, but times out without a sale, or the offeror terminates the offering. In this case no premium is paid and no payout is made.

FIG. 6 illustrates an example of an interface that may be displayed to a user when he accepts a contract. In this example, the user has selected contract line 545 in FIG. 5 for purchase. Contract information for contract line 545 is shown. In section 620, the user enters the number of contracts he wishes to purchase. The system calculates the total cost (number of contracts X premium), and displays it to the user in section 625. As the user is purchasing ten contracts in this example, and the system in the example is set up for $100 payouts on every contract that expires in the money, the potential return for the user in this example is $1,000.00, as shown in section 630.

Once the user has confirmed the purchase of ten of the selected contracts by clicking the confirm button 635, the system adjusts the matrix of available contracts. As shown in FIG. 7, the number of these contracts has been reduced by 10, to 66, as shown by contract line 710. As is illustrated by this example, it is not required that every offered contract be bought in a single order. The trading platform allows subsets of offered contracts to be purchased.

As illustrated by this example, traders select specific contracts to purchase. This is different from traditional exchanges, where a trader sends in an order, and the market maker determines which securities to purchase to fulfill the order. In these traditional exchanges, a market maker buys at one price and sells at another. There is no visible bid/ask spread in the trading platform of the current invention, as contracts are sent straight to the market. A two-way quote is not offered. Participants purchase contracts at the given price.

It is possible that different participants in the present trading system may offer identical contracts. As is known to those skilled in the art, there are many ways of handling this situation. The contracts may be listed on the same line with a total number of contracts set to the cumulative value of the number of identical contracts from the different participants. In this case, the contracts may be filled in the order that they were submitted to the trading system. Alternatively, participants who offer the largest block of contracts may have their orders filled first. Other methods are known to those skilled in the art and are intended to come within the scope of the present invention.

Figure 10:
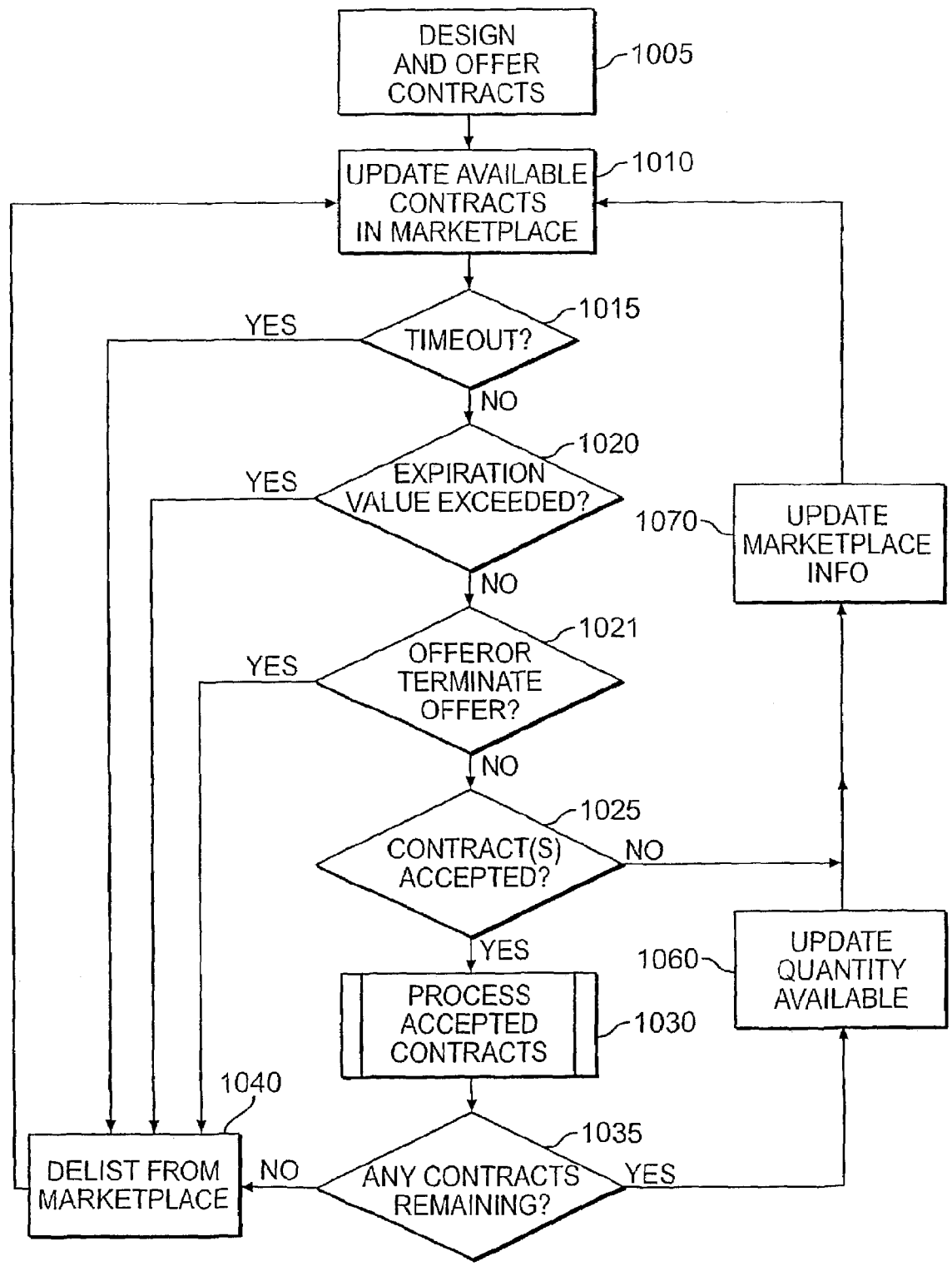
FIG. 10 illustrates the life cycle of a DELTA contract.

FIG. 10 illustrates the logical steps taken to keep the marketplace up-to-date as contracts are offered and accepted. As shown by step 1005, traders design and offer contracts into the marketplace. This process was described in connection with the example interface shown in FIG. 4. At step 1010, the marketplace is updated to include the offered contracts. This step was illustrated by the example updated marketplace shown in FIG. 5. If a contract has a timeout expiry, the marketplace periodically checks to see if an available contract should timeout and be removed from the marketplace at step 1015. If a contract should timeout, it is delisted from the marketplace, as shown by steps 1040 and 1010. The system also periodically checks any value expirations, as shown by step 1020. If the value of the underlying instrument for a contract has exceeded the contract's value expiration, it is also delisted from the marketplace, as shown by steps 1040 and 1010. In addition, the offeror of the contract may be given the option to terminate an offer. For example, if the offeror sees market activity that makes him reevaluate his position, he may choose to terminate the offered contract as shown by step 1021. In this case, when the system receives the termination, it will delist the offered contracts, and update the marketplace, as shown by steps 1040 and 1010. If a contract is accepted, the system arranges for payment of the premium from the acceptor to the offeror, determines whether the acceptor should receive the payout, and if so, arranges for payment of the payout from the offeror to the acceptor in the "Process Accepted Contracts" step shown by step 1030. If a contract is accepted, the system also checks to see whether all available contracts having the same parameters that were accepted at step 1035. If there are no remaining contracts with these parameters, the contracts are delisted from the marketplace, as shown by steps 1040 and 1010. If there are any remaining contracts, i.e., a subset of the available contracts was accepted, the available quantity is updated at step 1060 and the marketplace is updated at step 1010 to reflect the updated quantity. This was illustrated by the example updated marketplace in FIG. 7. If only a subset of available contracts was accepted, or if no contracts were accepted during this cycle, the marketplace information, such as current price, is updated at step 1070, and the marketplace is updated to reflect any changes at step 1010. For example, the current price of CSCO stock in FIG. 5 was $56.20. After a user accepted ten contracts as shown in FIG. 6, the marketplace is updated to reflect the updated quantity of available contracts, and the current price of CSCO stock is updated to $56.15 to reflect current market conditions, as shown in FIG. 7.

When processing accepted contracts in step 1030, if the contract offeror loses on a given contract, i.e., the contract ends up in the money, the payout amount of the contract (i.e. $100 in the example discussed above) is deducted from his brokerage account. The broker then sends the payout amount of the contract to the trading coordinator. The coordinator then sends the payout amount of the contract to the broker of the trader who accepted the contract. The acceptor of the contract then has the payout amount of the contract credited to his account with his broker.

When a trader accepts contracts, the premiums are deducted from his brokerage account. The actual settlement and clearing may take place immediately. In another embodiment, settlement and clearing may take place on a daily basis after accumulating all trade information. In this embodiment, all premiums for contracts, and proceeds from contracts that the trader accepted that hit the strike price before expiration, are cumulated such that only the net is deducted from or added to the trader's account on a daily basis. Other time settlement and clearing time periods, such as hourly, and methods of clearing are known to those skilled in the art and are intended to come within the scope of the present invention.

The trader's brokerage typically ensures that its clients have the resources at the net clearing at the end of the trading period. After the trading platform closes out with the brokers, the brokers then close out the net with its clients.

The entity operating the trading platform may charge transaction fees. This fee may be a fixed fee charged for each transaction, regardless of the number of contracts in the transaction. As an example, a transaction fee may be charged for every set of contracts accepted. Alternatively, a transaction fee may be charged for every contract offered. The transaction fee may act as a surrogate for the bid/ask spread on an options contract. The transaction fee is typically separate from the commissions collected by brokerage firms from their client to enter orders into the inventive system. Other methods of charging trading transaction fees are known to those skilled in the art, and are intended to come within the scope of the present invention.

Using the trading platform of the present invention, the inventive financial instruments trade without a visible bid/ask spread. This is an appealing feature as compared to Exchange Traded Options, which frequently trade with a significant markup from bid to ask. Traders can price contracts accordingly to effectively build in a profit margin.

The embodiments of the present invention discussed above encompass a trading system whereby traders can offer contracts that may be accepted by other traders. In an alternative embodiment, traders may also make offers to accept contracts. That is, not only may a trader offer to sell a contract, but he may also offer to buy, or accept, a contract.

One possible interface for a marketplace in this embodiment is shown in FIG. 8. As shown in this example, instead of only having put 810 and call S20 contracts available, the marketplace also has put 850 and call 860 offers available. The put and call contracts 810, 820 work as described in connection with FIGS. 2-7. However, if a trader accepts an offer to buy a contract listed in 850 and 860, he is agreeing to write the contract. For example, by accepting the put offer 855, the trader agrees to write the put contract stipulated in put offer line 855. In this case, the trader accepting the offer agrees to payout $100, or other set amount, if the contract expires in the money as defined by the expiry 840, Δ Change 841 and Premium 842 parameters in exchange for the $30.00 premium. The trader accepting the offer and thereby writing the contract is agreeing to the terms stipulated by the offeror. Additional terms, such as timeout expiry, value expiration, etc. may also be stipulated. Typically, the trader accepting the offer can choose how many of the contracts he wishes to write, up to the quantity available limit 843.

Another possible interface for a marketplace that allows contracts to be written and bought, and offered and accepted, is shown in FIG. 9. In this embodiment, the trader can choose to offer a contract where he selects whether he wants to be on the writer's side (collects the premium, and pays the payout if the contact expires in the money), or on the accepting side (pays the premium, and collects the payout if the contract expires in the money). As shown in FIG. 9, the marketplace of available contracts includes a "Side" parameter 930, 935 for the available contracts that shows which side of the transaction the offeror desires.

The trading platform of the present invention may also be used to collect valuable data. As all traders in the trading platform of the present invention use online brokerage accounts, the transactional data generated by the traders provides valuable insight into the online trading community only as opposed to entire trading community. Other statistics that may be calculated may include a ratio of puts versus calls, or average size of trade. A market indicator or index could be derived from the data.

There is a need for a new type of limited-risk high-leverage financial instrument. There is a need for a financial instrument that can be used by all retail traders. There is a need for a trading platform to trade this new type of financial instrument. The system and method of the present invention provides such a financial instrument and trading platform Although various embodiments are specifically illustrated and described herein, it will be appreciated that modifications and variations of the present invention are covered by the above teachings and within the purview of the appended claims without departing from the spirit and intended scope of the invention.

The invention claimed is:

1. A method of creating and trading a group of at least first and second related financial products, comprising:
   (a) identifying an interest rate, said interest rate having a first value corresponding to a value of the interest rate at a first time;
   (b) identifying an expiry and a fixed payout;
   (c) identifying a first premium to be paid by a buyer of the first financial product when the first financial product is issued;
   (d) selecting a first value change in the interest rate, wherein the first value change comprises an absolute change in value of the interest rate and a direction of change in value of the interest rate;
   (e) subsequent to the identifying of the fixed payout in step (b), executing a first transaction between a first seller and the buyer of the first financial product wherein the first seller receives the first premium from the buyer of the first financial product and in exchange agrees to pay the buyer of said first financial product the fixed payout if, between the first time and expiry, the value of the interest rate meets a first strike rate, wherein the first strike rate is a sum of the first value and the first value change; wherein said first financial product is worth nothing to the buyer of the first financial product if, between the first time and expiry, the value of the interest rate fails to meet the first strike rate; and wherein the first seller represents the only counterparty of the buyer of the first financial product in the first transaction;

(f) identifying a second premium to be paid by a buyer of the second financial product when the second financial product is issued, wherein the second premium is different from the first premium;

(g) selecting a second value change in the interest rate, wherein the second value change is different from the first value change, and the second value change comprises an absolute change in value of the interest rate and a direction of change in value of the interest rate, wherein the absolute change in value associated with the second value change is greater than the absolute change in value associated with first value change, and wherein the direction of change in value associated with the first value change is identical to the direction of change in value associated with the second value change;

(h) subsequent to the identifying of the fixed payout in step (b), executing a second transaction between a second seller and the buyer of the second financial product wherein the second seller receives the second premium from the buyer of the second financial product and in exchange agrees to pay the buyer of said second financial product the fixed payout if between the first time and expiry, the value of the interest rate meets a second strike rate, wherein the second strike rate is a sum of the first value and the second value change; wherein said second financial product is worth nothing to the buyer of the second financial product if, between the first time and expiry, the value of the interest rate fails to meet the second strike rate; and wherein the second seller represents the only counterparty of the buyer of the second financial product in the second transaction; and (i) providing a common electronic platform where the first transaction is executed, the second transaction is executed and a plurality of additional buyers execute further transactions to purchase further financial products selected from the group consisting of: (i) financial products defined by the expiry and the fixed payout, and having a premium identical to the first premium and a strike rate identical to the first strike rate, and (ii) financial products defined by the expiry and the fixed payout, and having a premium identical to the second premium and a strike rate identical to the second strike rate, and wherein said plurality of additional buyers include one or more buyers that are not counterparties to the first or second transaction.

2. The method of claim 1, wherein said first and second financial products are offered on a trading exchange, and may be accepted by another participant in the trading exchange.

3. A machine-readable medium for creating and trading a group of at least first and second related financial products, the medium having instructions stored thereon which when executed by a processor, cause the processor to: identify an interest rate, said interest rate having a first value corresponding to a value of the interest rate at a first time; identify an expiry and a fixed payout; identify a first premium to be paid by a buyer of the first financial product when the first financial product is issued; select a first value change in the interest rate, wherein the first value change comprises an absolute change in value of the interest rate and a direction of change in value of the interest rate; and subsequent to when the fixed payout is identified, execute a first transaction between a first seller and the buyer of the first financial product wherein the first seller receives the first premium from the buyer of the first financial product and in exchange agrees to pay the buyer of said first financial product the fixed payout if, between the first time and expiry, the value of the interest rate meets a first strike rate, wherein the first strike rate is a sum of the first value and the first value change; wherein said first financial product is worth nothing to the buyer of the first financial product if, between the first time and expiry, the value of the interest rate fails to meet the first strike rate; and wherein the first seller represents the only counterparty of the buyer of the first financial product in the first transaction; identify a second premium to be paid by a buyer of the second financial product when the second financial product is issued, wherein the second premium is different from the first premium; select a second value change in the interest rate, wherein the second value change is different from the first value change, and the second value change comprises an absolute change in value of the interest rate and a direction of change in value of the interest rate, wherein the absolute change in value associated with the second value change is greater than the absolute change in value associated with first value change, and wherein the direction of change in value associated with the first value change is identical to the direction of change in value associated with the second value change; and subsequent to when the fixed payout is identified, execute a second transaction between a second seller and the buyer of the second financial product wherein the second seller receives the second premium from the buyer of the second financial product and in exchange agrees to pay the buyer of said second financial product the fixed payout if, between the first time and expiry, the value of the interest rate meets a second strike rate, wherein the second strike rate is a sum of the first value and the second value change;

wherein said second financial product is worth nothing to the buyer of the second financial product if, between the first time and expiry, the value of the interest rate fails to meet the second strike rate; and wherein the second seller represents the only counterparty of the buyer of the second financial product in the second transaction; and provide a common electronic platform where the first transaction is executed, the second transaction is executed and a plurality of additional buyers execute further transactions to purchase further financial products selected from the group consisting of: (i) financial products defined by the expiry and the fixed payout, and having a premium identical to the first premium and a strike rate identical to the first strike rate, and (ii) financial products defined by the expiry and the fixed payout, and having a premium identical to the second premium and a strike rate identical to the second strike rate, and wherein said plurality of additional buyers include one or more buyers that are not counterparties to the first or second transaction.

* * * * *